United States Patent Office 2,780,703
Patented Feb. 5, 1957

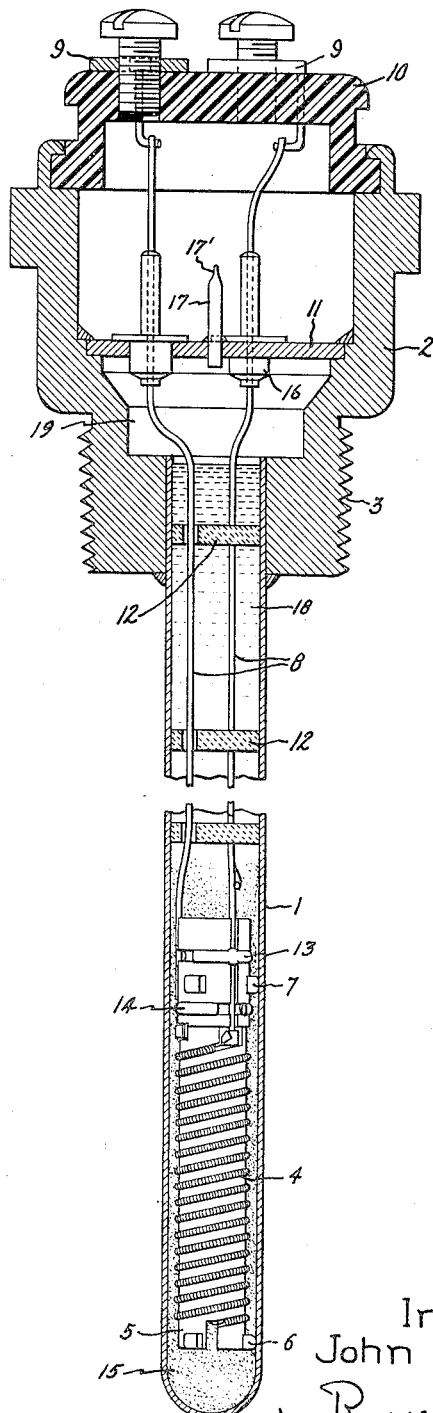

2,780,703

QUICK RESPONSE RESISTANCE TEMPERATURE DETECTOR

John R. Macintyre, South Peabody, Mass., assignor to General Electric Company, a corporation of New York Application November 12, 1952, Serial No. 320,086

3 Claims. (Cl. 201—63)

My invention relates to temperature detectors, and its object is to provide such a temperature detector which has a quick response to a change in temperature.

Where a resistance temperature detector is encased in a tube and packed in inert porous insulating material to protect it against corrosion, vibration, etc., the protecting material tends to slow the response, particularly because the inert packing material with its voids is a poor thermal conductor. According to my invention voids in the packing material between the outer protective tube and resistance element are filled with a non-corroding insulating liquid having good wetting ability, good thermal conductivity, and high chemical stability at all temperatures to be encountered in use. In this way the response time is reduced in about the ratio of 3 to 1.

The features of my invention which are believed to be novel and patentable will be pointed out in the claims appended hereto. For a better understanding of my invention reference is made in the following description to the accompanying drawing which illustrates a cross section of a resistance-type temperature detector embodying my invention.

Referring to the drawing, the detector plug unit comprises an outer metal tube 1 closed at the end containing the detector resistance and with its other end sealed into the central opening of a metal head 2. The tube 1 may be of stainless steel. The head is threaded at 3 so that the detector plug may be screwed into an opening in the wall of a furnace or other chamber in which the temperature is to be measured, with the detector tube part 1 within and the main portion of the head outside the chamber.

The resistance unit is shown at 4 and may be made of a coiled tungsten wire wrapped about an insulating support 5 which may be made of magnesia or other suitable insulating material. The insulating support 5 is represented as having a double turn spiral groove in its outer cylindrical surface in which the tungsten wire is wound to prevent misplacement. The support 5 is centered in tube 1 by centering members, some of which are shown at 6 and 7, which are projections integral with support 5 and contacting the inner wall of tube 1. The resistance element 4 is connected through leads 8 to terminals 9 in an insulating head cap 10 at the outer end of head 2. These leads are sealed through a gas and liquid tight partition 11 within the hollow head. There may be two or three lead wires 8, depending upon the measuring instrument connections to be used. Washer-like lead spacers 12 of insulating material are used as needed. The insulating support 5 extends beyond the resistance element 4 towards the head 2 to provide supports for the resistance ends of the lead wires and the electrical connections therebetween. Metal clasps 13 and 14 welded to the lead wires clasp the support 5 in grooves provided therefor and provide good support for such lead wires.

In assembling the parts a small amount of packing material such as magnesia powder is placed in the empty tube 1, with the tube vertical as shown, so that the powder fills the part 15 at the lower closed end of the tube. The support 5 with the resistance element 4 and lead-in wires assembled thereon is next lowered into place in the tube. More magnesia powder is then poured in and flows down around the support 5 between the resistance element 4 and the inside diameter of the tube. The powder is packed in tightly by vibrating the tube during the filling process. Sufficient powder is packed in at least completely to cover the upper end of the support 5. Magnesia rod spacers 12 are then added and spaced as needed. The lead-in wires are sealed through the metal plate 11 by glass seals at 16 and the plate 11 sealed to its seat in the head 2, as represented, by soldering or welding. The plate 11 contains a glass filling tube 17 sealed therethrough but left open. Preferably, the tube 1 is now connected to a vacuum pump through tube 17 in series with an enlarged glass tube containing the liquid which is to be passed into the tube 1 after evacuation. After evacuating the tube 1, the tube containing the liquid is positioned to allow the liquid to flow into the tube 1 and atmospheric pressure is applied to the fluid surface to assist in this filling operation. Tube 1 is filled with the fluid 18, allowing a small air space 19 at its upper surface just below plate 11 for fluid expansion. The tube 17 is now sealed off as represented at 17' in the drawing, and the terminal cap 10 added and fixed in place.

The fluid to be used is one which is non-corroding, has high chemical stability at high temperatures likely to be encountered in the use of the plug, good wetting ability, and good thermal conductivity. I have used a liquid silicone known to the trade as Dow Corning 703 silicon fluid, manufactured primarily for use in high vacuum diffusion pumps with excellent results. This fluid has a boiling point of 450 degrees centigrade and is satisfactory where the plug does not encounter higher temperatures. Other liquids having the necessary properties may be used.

The liquid soaks into the porous magnesia powder and completely fills the voids therein and wets the surfaces of 4 and 1 which it contacts and greatly increases the thermal conductivity between the resistance element and protective tube 1. It has been found that this expedient increases the thermal conductivity between the temperature detector and the protective tube 1 and reduces the response time of the resistance temperature detector in the order of about 3 to 1. Thus, if the temperature of the unit is at zero degrees centigrade and the exterior of tube 1 is inserted into a region which is at 100 degrees centigrade, it requires about ten seconds for the resistance element 4 to reach 100 degrees centigrade without the liquid in the tube, whereas with the liquid in the tube the time for a corresponding change is reduced to about 3½ seconds. This more rapid response time is of importance in measuring and controlling rapidly changing temperatures such as occur in the testing of gas turbines, jet engines, and the like. The details of the structure, manner of assembly, the exact materials to be used, etc., may be somewhat different from those described and will depend somewhat on the materials available and the intended use of the device.

Evacuation of the air in tube 1 prior to filling with liquid is desirable for the quick removal of air from the voids in the packing material about the resistance element 4, and the subsequent complete replacement of such air by the thermal conducting liquid. Considerable improvement, however, may be expected where the evacuation step is omitted, since a considerable portion of the air in the packing material will rise to the surface of the liquid as the liquid is added. Subsequent heating and cooling of the unit in use will tend to free additional air particles, and the response time will improve with use. Another procedure would be to leave a small opening in the bottom end of tube 1 and force the liquid upward therethrough, allowing the air to escape through tube 17 either with or without the aid of a vacuum pump. The more completely the liquid replaces air in the packing material about resistance element 4, the lower will be the response time, but the exact procedure as to how this is done is not important. After the tube has been sealed, the pressure therein is preferably approximately that of atmospheric pressure, since the pressure appears to have little influence on the response time. In some cases, however, I may use a higher than atmospheric pressure within the tube to increase the boiling point temperature of the liquid. It will be apparent that the invention is applicable to temperature detectors generally where the detector element, such for example as a thermocouple, is placed in a protective tube of the character described.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. A temperature detector unit comprising a sealed tube of stainless steel, a resistance-type temperature detector element supported in said tube out of contact with the inner walls thereof, a powdered insulating material employed as packing about the detector element between it and the inner walls of the tube, and a silicone fluid within the tube soaking the packing material and filling the voids therein, said fluid having a boiling point higher than the temperature for which the detector unit is designed to be used.

2. A temperature detector unit comprising a sealed tube of stainless steel, a support of insulating material centered in said tube adjacent one end thereof, a resistance-type temperature detector element in the form of a wire coiled on said support out of contact with the inner walls of said tube, a powdered insulating material packed between the detector element and the inner walls of said tube, lead wires extending from said detector element out of the other end of said tube, a closure wall at the last-mentioned end of said tube through which said lead wires are sealed, spacer supports for said lead wires within said tube, and a silicone liquid substantially filling the remaining space in said tube, said liquid having a boiling point of about 450 degrees centigrade.

3. An electrical temperature detector unit comprising a sealed stainless metal tube from which substantially all air has been evacuated, an electrical temperature detector element centrally supported within an end portion of, and out of contact with the inner walls of, said tube, packing made of particulate porous electric insulating material about the temperature detector element between it and the inner walls of the tube, and a silicone fluid substantially filling otherwise unoccupied space in said tube and filling the voids in the packing material for reducing the response time of said detector unit, said fluid having a boiling point greater than the maximum temperature for which said unit is designed.

References Cited in the file of this patent

UNITED STATES PATENTS

| | | |
|---|---|---|
| 2,117,287 | Block | May 17, 1938 |
| 2,444,410 | Keinath | June 29, 1948 |
| 2,460,795 | Warrick | Feb. 1, 1949 |
| 2,588,014 | Knudsen | Mar. 4, 1952 |
| 2,590,041 | Roost | Mar. 18, 1952 |